United States Patent
Sagebiel

(10) Patent No.: US 12,283,810 B2
(45) Date of Patent: Apr. 22, 2025

(54) INTERFERENCE FILTER ARRANGEMENT WITH SURGE PROTECTION

(71) Applicant: PHOENIX CONTACT GMBH & CO. KG, Blomberg (DE)

(72) Inventor: Hannes Sagebiel, Hameln (DE)

(73) Assignee: PHOENIX CONTACT GMBH & CO. KG, Blomberg (DE)

( * ) Notice: Subject to any disclaimer, the term of this patent is extended or adjusted under 35 U.S.C. 154(b) by 60 days.

(21) Appl. No.: 18/319,178

(22) Filed: May 17, 2023

(65) Prior Publication Data

US 2023/0378749 A1    Nov. 23, 2023

(30) Foreign Application Priority Data

May 18, 2022   (BE) .................................. 2022/5375

(51) Int. Cl.
- *H02H 9/04* (2006.01)
- *H01C 7/12* (2006.01)
- *H02H 5/04* (2006.01)

(52) U.S. Cl.
CPC ............ *H02H 9/042* (2013.01); *H02H 5/047* (2013.01); *H01C 7/12* (2013.01)

(58) Field of Classification Search
CPC ........ H02H 3/046; H02H 5/047; H02H 7/008; H02H 9/02; H02H 9/005; H02H 9/042; H02H 9/06; H01C 7/12; Y02E 40/40
USPC ......................................................... 361/118
See application file for complete search history.

(56) References Cited

U.S. PATENT DOCUMENTS

| | | | | |
|---|---|---|---|---|
| 2,550,462 A | * | 4/1951 | Fyler | G05F 1/607 363/117 |
| 2012/0044599 A1 | | 2/2012 | Veskovic | |
| 2014/0092514 A1 | * | 4/2014 | Chen | H01C 7/12 361/118 |

FOREIGN PATENT DOCUMENTS

| | | |
|---|---|---|
| DE | 202006016649 | 12/2006 |
| DE | 202011005045 | 8/2011 |
| DE | 202015106305 | 2/2017 |

OTHER PUBLICATIONS

"EMC filter surge protection device—CBT-4SFP-10—2748386" Phoenix Contact Dec. 2013 (Year: 2013).*

(Continued)

*Primary Examiner* — Kevin J Comber
(74) *Attorney, Agent, or Firm* — Sheridan Ross P.C.

(57) ABSTRACT

The object of the invention is interference filter arrangements with surge protection having, an input for a conductive phase and a neutral phase of a three-wire alternating-current voltage system, an output for a protected conductive phase and a protected neutral phase of a three-wire alternating-current voltage system, at least one terminal for a protective earth, at least one first coil arranged as a filter element between the input of the conductive phase and the output of the protected conductive phase, at least one second coil arranged as a filter element between the input of the neutral phase and the output of the protected neutral phase, at least one first three-pole gas-filled surge arrester arranged with its two external poles parallel to the first coil, at least one second three-pole gas-filled surge arrester arranged with its two external poles parallel to the second coil.

12 Claims, 3 Drawing Sheets

(56) References Cited

OTHER PUBLICATIONS

"CBT-4SFP-10 Data Sheet," Phoenixcontact, Jun. 2001, 2 pages [retrieved online from: docs.rs-online.com/29d1/0900766b80121f90.pdf.
Official Action with Machine Translation for Belgium Patent Application No. BE2022/5375, dated Jan. 23, 2023, 13 pages.

* cited by examiner

INTERFERENCE FILTER ARRANGEMENT WITH SURGE PROTECTION

CROSS-REFERENCE TO RELATED APPLICATION

This application claims the benefit of Belgian Application No. BE2022/5375 filed May 18, 2022, the entire contents of which are incorporated herein by reference in its entirety.

TECHNICAL FIELD

The invention relates to an interference filter arrangement with surge protection.

BACKGROUND

As digitization increases, many sectors are also seeing a greater need for protection devices because digital devices are particularly sensitive to power surges.

Therefore, surge protection systems are being used more and more.

However, digital devices are also increasingly sensitive to higher-frequency signal components from the power grid that may reach a device worth protecting. Sometimes such higher-frequency signal components are intentionally coupled into the power grid, e.g., for the purpose of transmitting data; sometimes such higher-frequency signal components are coupled into a power grid by means of active emitters; and sometimes these higher-frequency signal components also result from clocked switched mode power supply units.

Therefore, filter devices are utilized to reduce negative influences.

Combination solutions are seeing increased use here.

Typically, combination solutions consisting of filter and surge protection circuits require the surge protection components to be placed upstream (device input) and downstream (device output) from a filtering inductor.

If this is not done, then in the event of a power surge, either the voltage drop across the inductor would be impermissibly high (assuming that power surge protection components are at the output) or the filter circuit consisting of inductors and capacitor could be activated in such a manner (LC resonant circuit) that an increased voltage would occur at the output despite there being a voltage limiter at the input.

Two products, for example, are known from the applicant's product portfolio.

For example, product SFP 1-20-230AC is known, in which three varistors are used as surge protection components upstream of the inductor and three are used downstream of the inductor.

For this product, IEC Standard 61643-11 in the version dated 9 Mar. 2011 requires that a disconnect with associated status monitoring is to be provided. Since six varistors must be monitored here, a total of four thermal fuses are used. These thermal fuses are connected via an optocoupler to ensure that the triggering of a fuse also results in the extinguishing of the LED.

Another of the applicant's products, CBT-4SFP-10, avoids a proliferation of components and complex circuitry for signaling purposes in a different way, by connecting a gas-filled surge arrester parallel to a coil.

As a consequence, however, voltage is no longer applied to the varistors and triggering of the assigned thermal fuses cannot be signaled during normal operation. Therefore, to counter this problem, additional thermal fuses are installed in a signal circuit. However, this solution also has its challenges because now a coordinated triggering of the fuses in the signal circuit must be provided so that a blown fuse in the main circuit is also signaled accordingly. Conversely, however, it is also a challenge to design the fuses in such a manner that they do not trigger in error even when the main circuit is still operable.

The object of the invention is to provide a simple and cost-effective solution that allows for reliable signaling while simultaneously reducing the number of expensive/error-prone structural components.

BRIEF SUMMARY

According to the invention, the object is achieved by the features of the independent claims. Advantageous designs of the invention are indicated in the dependent claims.

BRIEF DESCRIPTION OF THE DRAWINGS

The invention is explained in greater detail below using preferred embodiments with reference to the attached drawing.

DETAILED DESCRIPTION

The invention will be described in greater detail below with reference to the drawings.

It should be noted that various aspects are described which can be used individually or in combination. This means that any given aspect can be used with various embodiments as long as it is not explicitly represented as a mere alternative.

Also, for simplicity's sake and as a rule, reference will always be made below to only one entity. However, unless noted otherwise, the invention may also have several of any of the entities in question. To that extent, the use of the words "a" and "an" are to be understood only as an indication that at least one entity is being used in a single embodiment.

To the extent that methods are described hereinafter, the individual steps of a method can be arranged and/or combined in any sequence as long as the context does not explicitly provide otherwise. Furthermore, the methods can be combined with one another unless expressly indicated otherwise.

As a rule, specifications having numerical values are not to be understood as exact values, but as having a tolerance of +/−1% to +/−10%.

References to standards or specifications or norms shall be understood to be references to standards or specifications or norms which are or were valid at the time of the application or—if a priority is claimed—at the time of the priority filing. However, this shall not be understood as a general exclusion of the applicability of subsequent or superseding standards or specifications or norms.

Figure 1:
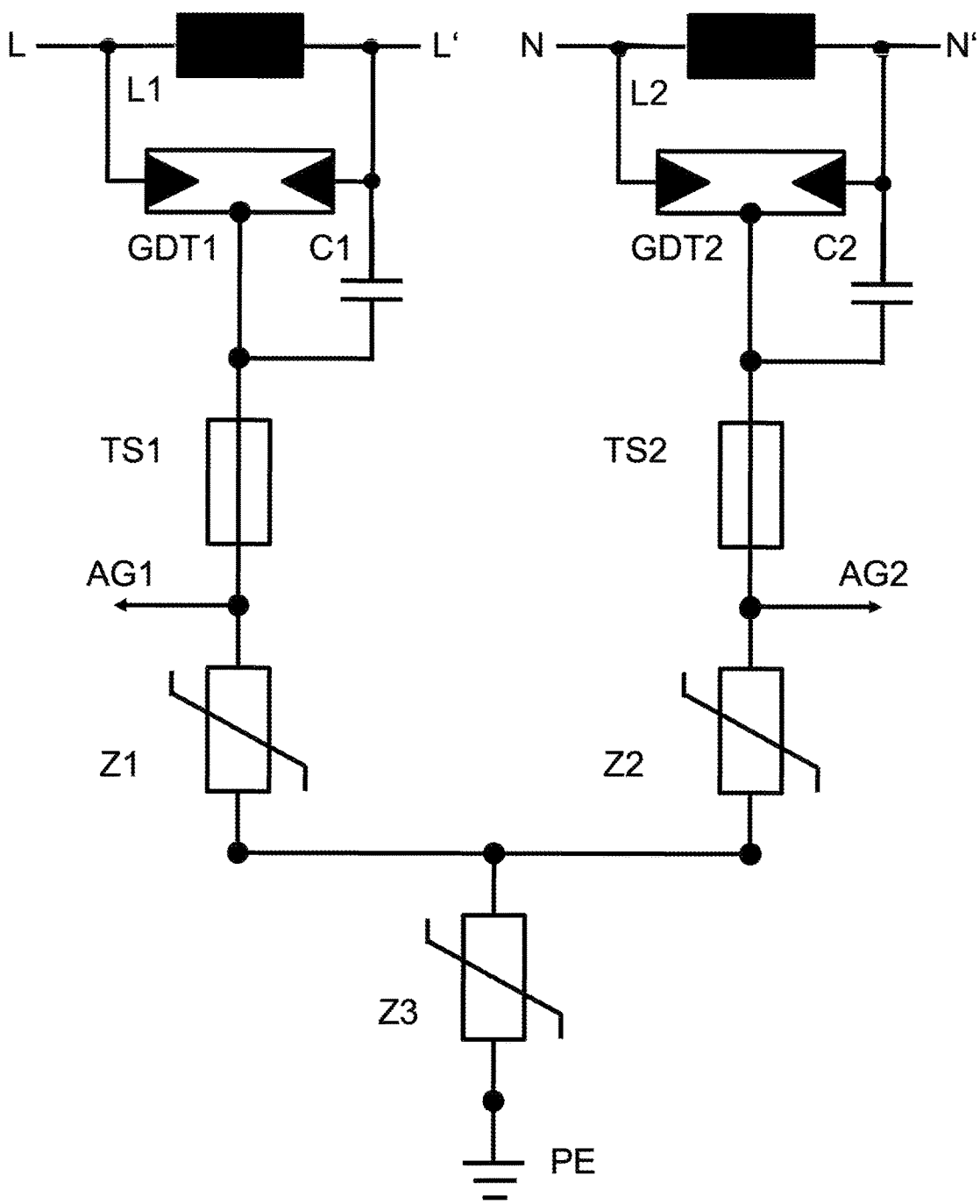
FIG. 1 shows schematically a first aspect of an interference filter arrangement with surge protection.

FIG. 1 shows a first embodiment of an interference filter arrangement with surge protection 1 according to the invention.

The interference filter arrangement with surge protection 1 according to the invention has at least one input IN for a conductive phase L and a neutral phase N of a three-wire alternating—current voltage system and an output OUT for a protected conductive phase 1' and a protected neutral phase N' of a three-wire alternating-current voltage system.

Furthermore, the interference filter arrangement with surge protection 1 according to the invention has at least one terminal for a protective earth PE.

The interference filter arrangement with surge protection 1 according to the invention has at least a first coil L1, which is arranged as a filter element between the input of the conductive phase L and the output of the protected conductive phase L'. Likewise, the interference filter arrangement with surge protection 1 according to the invention has at least a second coil L2, which is arranged as a filter element between the input of the neutral phase N and the output of the protected neutral phase N'.

Furthermore, the interference filter arrangement with surge protection 1 according to the invention has at least one first three-pole gas-filled surge arrester GDT1, which is arranged with its two external poles parallel to the first coil L1, as well as at least one second three-pole gas-filled surge arrester GDT2, which is arranged with its two external poles parallel to the second coil L2.

In addition, the interference filter arrangement with surge protection 1 according to the invention has at least three varistors Z1, Z2, Z3, wherein the first varistor Z1 is connected to the pole of the first three-pole gas-filled surge arrester GDT1 that is not connected to the coil, the second varistor Z2 is connected to the pole of the second three-pole gas-filled surge arrester GDT2 that is not connected to the coil, and the third varistor Z3 is connected directly or indirectly to the protective earth.

To provide electricity, e.g., for an operating mode indicator, in the interference filter arrangement with surge protection 1 according to the invention, a first capacitor C1 and/or a first resistor is/are arranged parallel to one of the poles of the first three-pole gas-filled surge arrester GDT1 that are connected to the coil and to the pole of the first three-pole gas-filled surge arrester GDT1 leading to the first varistor Z1, and a second capacitor C2 and/or a first resistor is/are arranged parallel to one of the poles of the second three-pole gas-filled surge arrester GDT2 that are connected to the coil and to the pole of the second three-pole gas-filled surge arrester GDT2 leading to the second varistor Z2.

Optionally, embodiments may provide that, as shown in FIG. 1, the interference filter arrangement with surge protection 1 according to the invention is provided with a first thermally activatable disconnection point TS1 between the first varistor Z1 and the first three-pole gas-filled surge arrester GDT1, and with a second thermally activatable disconnection point TS2 between the second varistor Z2 and the second three-pole gas-filled surge arrester GDT2.

A first voltage tap AG1 can then be provided between the first thermally activatable disconnection point TS1 and the first varistor Z1 and a second voltage tap AG2 between the second thermally activatable disconnection point TS2 and the second varistor Z2, wherein the first voltage tap AG1 and the second voltage tap AG2 are available for an operating mode indicator LED and/or remote signaling FM of the operating state.

Figure 2:
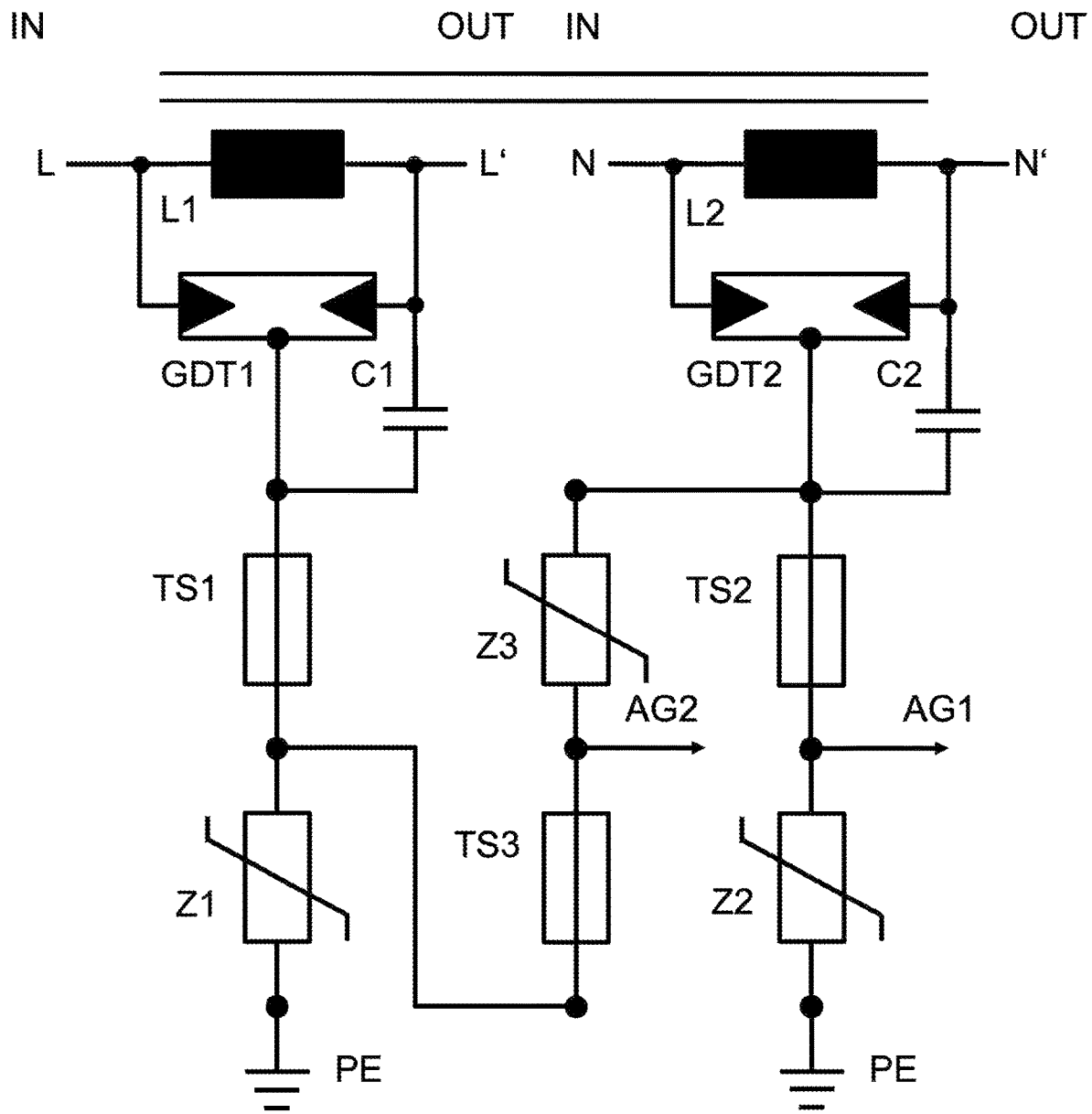
FIG. 2 shows schematically a second aspect of an interference filter arrangement with surge protection.

According to FIG. 2, in an alternative embodiment of the invention in FIG. 1, an interference filter arrangement with surge protection 1 is provided which provides an input IN for a conductive phase L and a neutral phase N of a three-wire alternating-current voltage system and an output OUT for a protected conductive phase L' and a protected neutral phase N' of a three-wire alternating-current voltage system.

The interference filter arrangement with surge protection 1 according to the invention has at least one connection for a protective earth PE.

Furthermore, the interference filter arrangement with surge protection 1 according to the invention has a first coil L1 arranged as a filter element between the input of the conductive phase L and the output of the protected conductive phase L', and at least one second coil L2 arranged as a filter element between the input of the neutral phase N and the output of the protected neutral phase N'.

In addition, the interference filter arrangement with surge protection 1 according to the invention hast at least one first three-pole gas-filled surge arrester GDT1 arranged with its two external poles parallel to the first coil L1, and at least one second three-pole gas-filled surge arrester GDT2 arranged with its two external poles parallel to the second coil L2.

Furthermore, the interference filter arrangement with surge protection 1 according to the invention has at least three varistors Z1, Z2, Z3, wherein the first varistor Z is connected to the pole of the first three-pole gas-filled surge arrester GDT1 that is not connected to the coil, the second varistor Z2 is connected to the pole of the second three-pole gas-filled surge arrester GDT2 that is not connected to the coil, and the third varistor Z3 is also connected to the pole of the second three-pole gas-filled surge arrester GDT2 that is not connected to the coil.

To provide electricity, e.g., for an operating mode indicator, in the interference filter arrangement with surge protection 1 according to the invention, a first capacitor C1 and/or a first resistor is/are arranged parallel to one of the poles of the first three-pole gas-filled surge arrester GDT1 that are connected to the coil and to the pole of the first three-pole gas-filled surge arrester GDT1 leading to the first varistor Z1, and a second capacitor C2 and/or a first resistor is/are arranged parallel to one of the poles of the second three-pole gas-filled surge arrester GDT2 that are connected to the coil and to the pole of the second three-pole gas-filled surge arrester GDT2 leading to the second varistor Z2.

Optionally, it may be provided in these embodiments that, as shown in FIG. 2, the interference filter arrangement with surge protection 1 according to the invention is provided with a first thermally activatable disconnection point TS1 between the first varistor Z1 and the first three-pole gas-filled surge arrester GDT1 and a second thermally activatable disconnection point TS2 between the second varistor Z2 and the second three-pole gas-filled surge arrester GDT2, and the third varistor Z3 is connected directly to the second three-pole gas-filled surge arrester GDT2, wherein subsequent to the third varistor Z3, a third thermal disconnection point TS3 is provided, wherein on the side of the third thermal disconnection point TS3 facing away from the third varistor Z3 an electrical connection is provided to a voltage tap between the first thermally activatable disconnection point TS1 and the first varistor Z1, wherein between the second thermally activatable disconnection point TS2 and the second varistor Z3, there is provided a first voltage tap AG1, and between the third thermally activatable disconnection point TS3 and the third varistor Z3, there is provided a second voltage tap AG2, wherein the first voltage tap AG1 and the second voltage tap AG2 are available for an operating mode indicator LED and/or remote signaling FM of the operating state.

In the second embodiment, both the voltage supply for the signal circuit during operation and its interruption if a fault occurs can be provided by the depicted circuitry with very few structural elements.

In the embodiments described above according to FIGS. 1 and 2, there is a capacitor C1 and C2, respectively, connected in parallel to one of the outer electrodes and the middle electrode of the three-pole gas-filled surge arrester GDT1 and GDT2, respectively.

The varistors Z1, Z2, Z3 used may be arranged in a delta connection (FIG. 2) as well as in a Y connection (FIG. 1).

The advantage of the embodiment according to FIG. 2 is that better protection levels can be achieved, especially at low system voltages.

The advantage of the embodiment according to FIG. 1 is that only two of the three varistors Z1, Z2, Z3 must be monitored.

Monitoring can be performed both via a temperature separation point on the varistor and via a (thermal) fuse as an additional component in thermal communication with a varistor to be monitored (and/or another structural element).

The monitoring means can be arranged independently of each other in such a manner that the triggering of a monitoring means disconnects a signal circuit with a local signal indicator LED.

In all embodiments, it may also be provided that at least one of the thermally activatable disconnection points TS1, TS2, TS3 has a thermal switch.

A thermal switch may be provided by a solder point, for example, which melts when heated and releases a spring contact. The switching process is preferably irreversible.

It may also be provided in all embodiments that at least one of the thermally activatable disconnection points TS1, TS2, TS3 has a thermal fuse F1, F2.

Obviously, multiple thermally activatable disconnection points may be arranged in succession to detect impermissible heating events at various locations of a varistor (or another structural element) for example, or to monitor various components (e.g., inside a current path). Likewise, various embodiments of thermally activatable disconnection points TS1, TS2, TS3 may also offer varying responsiveness. Likewise, providing multiple thermally activatable disconnection points TS1, TS2, TS3 can offer redundancy.

It may also be provided in all embodiments that a signal circuit is actuated in the event that one of the thermally activatable disconnection points TS1, TS2, TS3 is disconnected.

Figure 3:
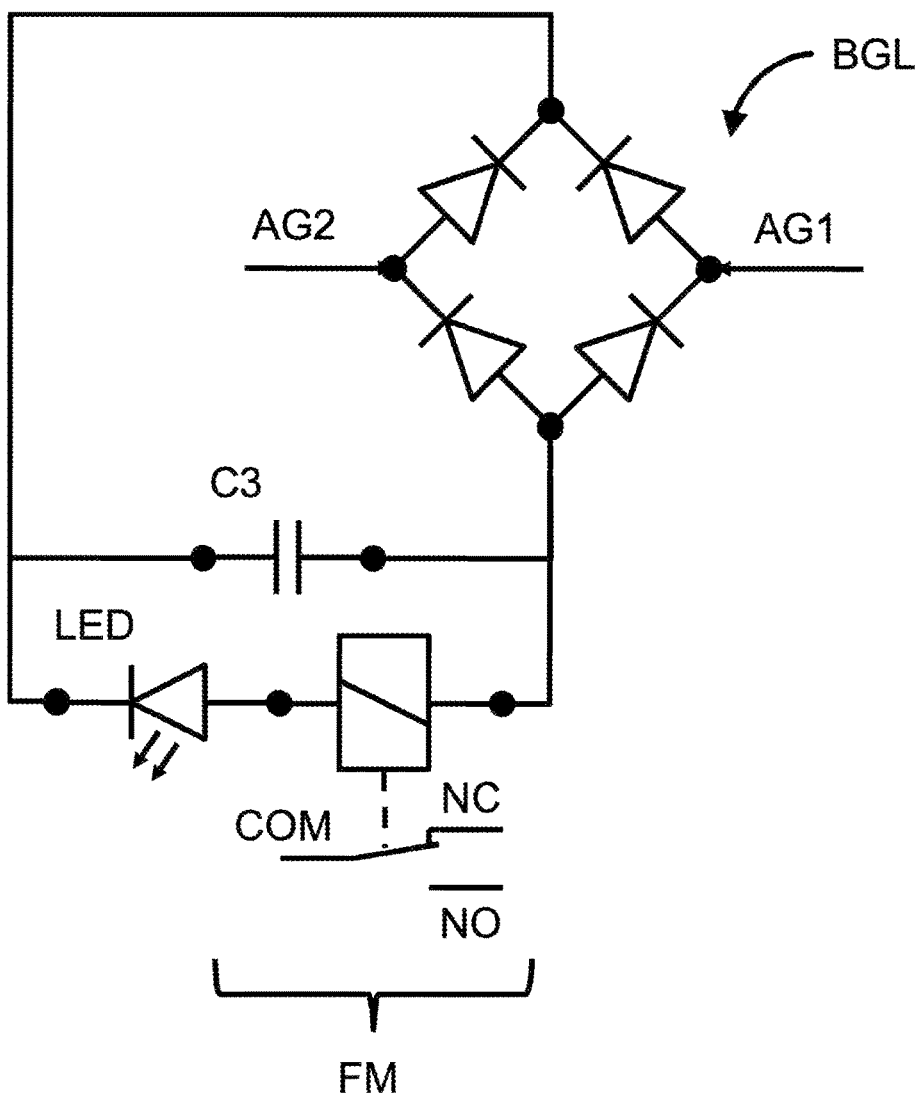
FIG. 3 shows schematically a third aspect of an interference filter arrangement with surge protection.

A sample signal circuit is shown in FIG. 3. It receives an alternating-current voltage in the normal operating mode from the voltage taps, for example (via capacitors C1, C2), which can be rectified for example in a rectifier—depicted as a bridge rectifier—and smoothed via an (electrolytic) capacitor C3.

In particular, in all embodiments according to the invention, the signal circuit may have a local signal indicator LED, which in the event of thermal activation results in a visually detectable change of the local signal indicator LED, e.g., in the extinguishing of an operating status indicator.

Obviously, however, other signal generators, for example acoustic signal generators, may be provided.

In particular, in all embodiments according to the invention, a remote signaling interface FM may be provided by means of which the functional state can be accessed. This can also be integrated in a signal circuit as shown in FIG. 3.

For example, a three-way switch can be controlled as a potential-free switch via a relay so that a change in potential can be identified, for example. To this end, the three-way switch has a common pole COM as well as a pole that is connected in its idle state (NC—normally connected) and a pole that is disconnected in its idle state (NO—normally open).

Without limiting generality, other structural elements, such as series resistors and so on, may naturally also be present.

In all embodiments of the invention, the signal circuit may have both a local signal indicator LED and a remote signaling interface FM, which can be jointly actuated in the event of thermal activation.

Figure 4A:
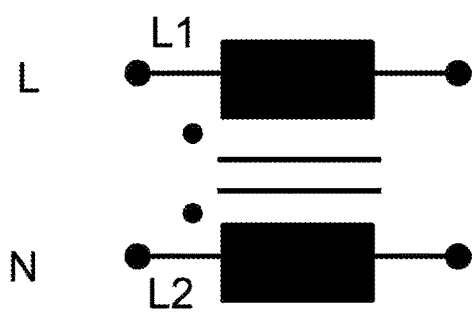
FIGS. 4a and 4b show various designs of coils according to another aspect of the invention.
Figure 4B:
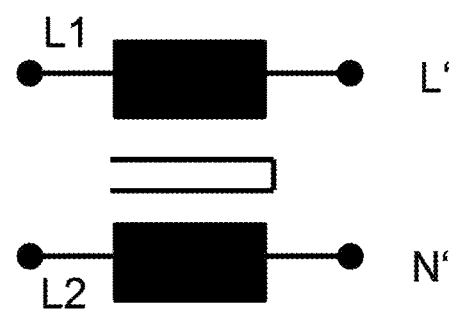

In all embodiments of the invention, both the first coil L1 and the second coil L2 may be designed as a current-compensated choke (FIGS. 4a and 4b).

Likewise, in all embodiments of the invention, the first coil L1 and the second coil L2 may be designed as a bifilar coil (FIGS. 4a and 4b).

Embodiments of the invention may provide that two or more electrically mutually connected terminals are provided for the protected conductive phase L'.

Embodiments of the invention may provide that two or more electrically mutually connected terminals are provided for a protected neutral phase N'.

Embodiments of the invention may provide that two or more electrically mutually connected terminals are provided for the protective earth.

If a capacitor and resistor combination is mentioned above, it is to be generally understood to be a series connection consisting of a capacitor and resistor.

LIST OF REFERENCE SIGNS

Interference filter arrangement with surge protection 1
Input IN
Output OUT
Conducting phase L
Neutral phase N
Output OUT
Protected conducting phase L'
Protected neutral phase N'
Protective earth PE
Coil L1, L2
Three-pole gas-filled surge arrester GDT1, GDT2
Varistor Z1, Z2, Z3
Capacitor C1, C2, C3
Thermally activatable disconnection points TS1, TS2, TS2
Voltage tap AG1, AG2
Signal indicator LED
Remote signaling interface FM
Bridge rectifier BGL
Common pole COM
Pole connected in idle state NC
Pole disconnected in idle state NO

The invention claimed is:

1. An interference filter arrangement with surge protection having an input for a conductive phase and a neutral phase of a three-wire alternating-current voltage system, an output for a protected conductive phase and a protected neutral phase of a three-wire alternating-current voltage system, at least one terminal for a protective earth, at least one first coil arranged as a filter element between the input of the conductive phase and the output of the protected conductive phase, at least one second coil arranged as a filter element between the input of the neutral phase and the output of the protected neutral phase, at least one first three-pole gas-filled surge arrester arranged with its two external poles parallel to the first coil, at least one second three-pole gas-filled surge arrester arranged with its two external poles parallel to the second coil, at least three varistors, wherein a first varistor is connected to the pole of the first three-pole gas-filled surge arrester that is not connected to the first coil, a second varistor is connected to the pole of the second three-pole gas-filled surge arrester that is not connected to the second coil, and a third varistor is directly or indirectly connected to the protective earth, wherein a first capacitor and/or a first resistor is/are arranged in parallel to one of the poles of the first three-pole gas-filled surge arrester that are connected to the first coil and the pole of the first three-pole gas-filled surge arrester leading to the first varistor, wherein a second capacitor and/or a second resistor is/are arranged in parallel to one of the poles of the second three-pole gas-filled surge arrester that are connected to the second coil and the pole of the second three-pole gas-filled surge arrester leading to the second varistor.

2. The interference filter arrangement with surge protection according to claim 1, wherein between the first varistor and the first three-pole gas-filled surge arrester, there is provided a first thermally activatable disconnection point and between the second varistor and the second three-pole gas-filled surge arrester, there is provided a second thermally activatable disconnection point,
wherein between the first thermally activatable disconnection point and the first varistor, there is provided a first voltage tap and
between the second thermally activatable disconnection point and the second varistor, there is provided a second voltage tap,
wherein the first voltage tap and the second voltage tap are available for an operating mode indicator and/or remote signaling of the operating state.

3. The interference filter arrangement with surge protection according to claim 2, wherein at least one of the thermally activatable disconnection points has a thermal switch.

4. The interference filter arrangement with surge protection according to claim 2, wherein at least one of the thermally activatable disconnection points has a thermal fuse.

5. The interference filter arrangement with surge protection according to claim 2, wherein a signal circuit is actuated in the event that one of the thermally activatable disconnection points is disconnected.

6. The interference filter arrangement with surge protection according to claim 5, wherein the signal circuit has a local signal indicator, which in the event of thermal activation results in a visually detectable change of the local signal indicator.

7. The interference filter arrangement with surge protection according to claim 1, wherein a remote signaling interface is still provided by means of which a functional state is accessed.

8. The interference filter arrangement with surge protection according to claim 5, wherein the signal circuit has a local signal indicator and a remote signaling interface, which are jointly actuated in the event of thermal activation.

9. The interference filter arrangement with surge protection according to claim 1, wherein the first coil and the second coil are designed as a current-compensated throttle.

10. The interference filter arrangement with surge protection according to claim 1, wherein the first coil and the second coil are designed as a bifilar coil.

11. An interference filter arrangement with surge protection, having an input for a conductive phase and a neutral phase of a three-wire alternating current voltage system, an output for a protected conductive phase and a protected neutral phase of a three-wire alternating current voltage system, at least one terminal for a protective earth, at least one first coil arranged as a filter element between the input of the conductive phase and the output of the protected conductive phase, at least one second coil arranged as a filter element between the input of the neutral phase and the output of the protected neutral phase, at least one first three-pole gas-filled surge arrester arranged with its two outer poles parallel to the first coil, at least one second three-pole gas-filled surge arrester arranged with its two outer poles parallel to the second coil, at least three varistors, wherein a first varistor is connected to the pole of the first three-pole gas-filled surge arrester that is not connected to the first coil, a second varistor is connected to the pole of the second three-pole gas-filled surge arrester that is not connected with the second coil, and a third varistor is also connected to the pole of the second three-pole gas-filled surge arrester that is not connected to the second coil, wherein a first capacitor and/or a first resistor is/are arranged in parallel to one of the poles of the first three-pole gas-filled surge arrester that are connected to the first coil and the pole of the first three-pole gas-filled surge arrester leading to the first varistor, wherein a second capacitor and/or a second resistor is/are arranged in parallel to one of the poles of the second three-pole gas-filled surge arrester that are connected to the second coil and the pole of the second three-pole gas-filled surge arrester leading to the second varistor.

12. The interference filter arrangement with surge protection according to claim 3, wherein
a first thermally activatable disconnection point is provided between the first varistor and the first three-pole gas-filled surge arrester,
a second thermally activatable disconnection point is provided between the second varistor and the second three-pole gas-filled surge arrester and the third varistor is directly connected to the second three-pole gas-filled surge arrester, wherein a third thermal disconnection point is provided downstream from the third varistor,
wherein on the side of the third thermal disconnection point facing away from the third varistor, there is provided an electrical connection to a voltage tap between the first thermally activatable disconnection point and the first varistor,
wherein between the second thermally activatable disconnection point and the second varistor, there is provided a first voltage tap, and between the third thermal disconnection point and the third varistor, there is provided a second voltage tap,
wherein the first voltage tap and the second voltage tap are available for an operating mode indicator and/or remote signaling of the operating state.

\* \* \* \* \*